United States Patent
Schneider et al.

(10) Patent No.: US 6,631,727 B2
(45) Date of Patent: Oct. 14, 2003

(54) METHOD OF CLEANING AND/OR REGENERATING WHOLLY OR PARTIALLY DE-ACTIVATED CATALYSTS OF STACK-GAS NITROGEN SCRUBBING

(75) Inventors: Gunter Schneider, Bietigheim-Bissingen (DE); Jochen Benz, Ludwigsburg (DE); Peter Buck, Neckarsulm (DE)

(73) Assignee: Energie-Versorgung Schwaben AG, Stuttgart (DE)

( * ) Notice: Subject to any disclaimer, the term of this patent is extended or adjusted under 35 U.S.C. 154(b) by 89 days.

(21) Appl. No.: 09/842,621

(22) Filed: Apr. 27, 2001

(65) Prior Publication Data

US 2002/0006860 A1 Jan. 17, 2002

Related U.S. Application Data

(62) Division of application No. 09/147,477, filed as application No. PCT/EP97/03650 on Jul. 10, 1997, now Pat. No. 6,232,254.

(30) Foreign Application Priority Data

Jul. 12, 1996 (DE) .......................................... 196 28 212

(51) Int. Cl.[7] ................................................ B08B 3/02
(52) U.S. Cl. ................ 134/110; 134/115 R; 134/166 R
(58) Field of Search .......................... 134/115 R, 166 R, 134/110, 166 C, 169 R, 169 C; 431/9, 10

(56) References Cited

U.S. PATENT DOCUMENTS 5,689,798 A * 11/1997 Oeste

FOREIGN PATENT DOCUMENTS

| FR | 2123917 | * | 9/1972 |
| JP | 52-28460 | * | 3/1977 |
| JP | 53-26772 | * | 3/1978 |
| JP | 58-20234 | * | 2/1983 |
| JP | 58-189041 | * | 11/1983 |
| JP | 60-71079 | * | 4/1985 |
| JP | 61-254230 | * | 11/1986 |
| JP | 8-173764 | * | 7/1996 |

OTHER PUBLICATIONS

European Patent Office 824,973 Aug. 1997.*

* cited by examiner

*Primary Examiner*—Frankie L. Stinson
(74) *Attorney, Agent, or Firm*—Jones, Tullar & Cooper, P.C.

(57) ABSTRACT

A cleaning kit for removing process impurities carried on the surface of a $NO_x$ reduction catalyst which is installed in the path of a flue gas flow exiting from a fossil fuel burning facility including: a reagent supply grill; a source of supply of liquid cleaning reagent; a reagent collection basin; and a recirculating structure. The reagent supply grid is adapted to be selectively positioned above a portion of a catalyst layer. The source of supply of liquid cleaning reagent adapted to be in communication with the supply grid, and the reagent collection basin being adapted to be selectively positioned below the portion of such catalyst layer to catch cleaning reagent therein after such reagent passes through such portion of the catalyst layer, the recirculating structure recirculates at least a portion of such reagent from the collecting basin for recirculating through such supply grid for further cleaning of such portion of the catalyst layer.

3 Claims, 3 Drawing Sheets

METHOD OF CLEANING AND/OR REGENERATING WHOLLY OR PARTIALLY DE-ACTIVATED CATALYSTS OF STACK-GAS NITROGEN SCRUBBING

This application is a divisional of Ser. No. 09/147,477 filed Jan. 7, 1999, now U.S. Pat. No. 6,232,259, which is a 371 of PCT/97/03650 filed Jul. 10, 1997.

FIELD OF THE INVENTION

The present invention relates to a method for scrubbing and/or regenerating of wholly of partially deactivating catalytic devices for nitrous oxide removal from stack gases, wherein the catalytic devices are treated with a scrubbing, or respectively regeneration fluid.

BACKGROUND OF THE INVENTION

Such catalytic devices are also called SCR (selective catalytic reduction) catalytic devices. The deactivation of such catalytic devices has several different causes, mainly:

Clogging of the honeycomb structure, or respectively the free spaces in the catalytic device. Because of this, the stack gas does not reach the catalytic device and the clogged conduit of the catalytic device is not used for the catalytic reaction. In order to use the installed catalytic material as efficiently as possible, attempts are made to decrease the clogging of honeycomb channels or plate channels by cleaning measures, such as steam blowers in the DENOX installation of manual cleaning actions. In spite of this, some of these honeycombs, or respectively free spaces in the catalytic device, become clogged over time. With some installations the catalyst modules are removed and placed on an appropriate shaking device. The clogs are loosened by the shaking movements. In this way the stack gas again gains access to the catalytic material. The increase in activity does not constitute a regeneration, it only provides access to the clogged catalytic material. The surface layer being formed during operation remains untouched by this cleaning step.

Worsening of the gas diffusion at the surface of the wall of the catalytic device because of the growth of a thin surface layer of approximately 1 to 100 μm and clogging of pores. Because of this, the stack gas can only reach the pores of the catalytic material poorly of not at all. The formation of a thin surface layer worsens the chemical transformation of $NO_x$ and $NH_3$ into $N_2$ and $H_2O$, because the gas diffusion into the catalytic material is greatly hampered.

Clogging of the active catalytic centers on the surface of the catalytic devices by means of the accumulation of so-called catalytic poisons, for example As, K, Na. The settling of catalytic poisons, such as arsenic, for example, on the active centers of the catalytic device makes the reaction at these centers impossible and in this was also aids in a reduction of the activities of the catalytic material.

Abrasion of catalytic material by solids, such a fly ash, contained in the stack gas. The catalytic material is reduced because of the loss of catalytic material and therefore of the surface available for the reaction. The abrasion of catalytic material is irreversible process which results in a permanent loss of activity. The following actions can also simultaneously occur in the course of abrasion by fly ash:

Removal of catalytic material and of an existing surface layer,

Retention of components of the fly ash and therefore formation of a fresh gas diffusion-hindering surface layer.

A method is described in German Patent DE 38 16 600 C2, in which the regeneration of catalytic devices contaminated by arsenic is described. This method does not take into consideration the portion of the deactivation by a gas diffusion-hindering surface layer. Aqueous solutions of nitric acid, hydrochloric acid, sulfuric acid of acetic acid are employed as the scrubbing suspension in the method according to the noted German Patent. These scrubbing suspensions have the disadvantage that for one they are too expensive and also that the disposal of the acids contaminated by arsenic is elaborate.

A method is described in European Patent, EP 0 136 966 B1, in which initially the dust adhering to the surface is removed with dry steam. The catalytic poisons are then intended to be dissolved and rinsed out in a second step by wet steam with a moisture content of $\leq=0.4$. Drying is performed with dry steam again. In the method in accordance with this European Patent, the thin, gas diffusion-hindering layer is not removed in a first step, instead clogged conduits are merely opened again. This has already been done on a large-scale basis for a long time in the form of so-called dust or soot blowers. The second step of this method can have an activity-increasing effect only with catalytic devices wherein the gas diffusion-hindering layer does not exist over the entire surface or not at all. Also, the generation of large amounts of dry and wet steam is very energy-intensive.

A regeneration method for deactivated catalytic devices is described in Japanese Patent, JP-A-63 147 155, wherein the catalytic devices are removed, placed into a basket, which is suspended in a regeneration treatment tank. A flow of regeneration fluid exists in the tank. The fluid consists of a suspension of an abrasive powder in water or in an acid scrubbing fluid.

Japanese Patent, JP-A-52 027 091, describes a regenerating method, in which catalytic devices with reduced performance are treated with water with a diluted aqueous inorganic acid.

U.S. Pat. No. 4,210,628 describes catalytic devices for nitrogen removal made of pulverulent or granular activated charcoal with catalytic metal additives (W, MO, V, CU, etc.). When the catalytic activity is reduced because of the formation of ammonium sulfate, the pulverulent catalytic products, which have been packed into a column, are regenerated in that either N2 in passed through them at 350° C. or they are washed with hot water at approximately 80° C.

A method for the reactivation of catalytic devices is described in German Patent, DE 30 20 698 C2, which removes the deactivating substances by means of a defined pressure and a defined temperature. Various gases, for example methane, propane, carbon dioxide or argon can be added in the process for optimizing the method. This method also does not consider the gas diffusion-hindering surface layer.

A great disadvantage of most of the mentioned methods is the fact that they can only be performed in a separate installation. To this end the removal of the catalytic devices and therefore an outage of the installation is required.

SUMMARY OF THE INVENTION

Accordingly, it is an object of the present invention to further develop a method of the type mentioned above in such a way that gas diffusion on the surface of the catalytic devices is again made possible, wherein additionally the clogging of the active centers by catalytic poisons is reversed to the greatest extent possible, and which can be performed inside the nitrogen removal installation without the removal of the catalytic devices.

This object is attained in that the scrubbing, or respectively regenerating fluid is fully desalinated water.

The function of the present invention is based on the dissolution and removal of the surface layer for restoring the gas diffusion and exposing of active centers for the nitrogen-removing reaction of the surface of the catalytic device. In this case the composition of the fluid must be selected in such a way that, along with a small consumption of regenerating suspension, the fastest possible dissolution of the surface layer is achieved. In connection with the regeneration of SCR catalytic devices it has surprisingly been shown to be useful to employ fully desalinated water, for example demineralized water, for dissolving the surface layer. The use of demineralized water as the scrubbing fluid prevents the introduction of catalytic poisons with the scrubbing fluid. In comparison with other possible fluids, demineralized water has the advantage that it is relatively inexpensive and that in most cases it can be produced at the location of the power plant itself The cleaning and regeneration of the catalytic devices is performed at ambient temperatures, so that no energy is required for heating the fluid. By means of this method it is possible to drastically reduce the number of deactivated catalytic devices to be disposed. Above all, in large installations for the reduction of nitric oxides, so-called DENOX installations, this method is suitable for regenerating the used and deactivated catalytic devices, i.e. to again increase the reduced catalytic activities, without having to remove them An advantageous further development of this method provides, that the catalytic devices are first mechanically cleaned by vacuuming or blowing the deposits out, which is then followed by a scrubbing cycle, which removes the surface layer by means of a regenerating suspension and dissolves the clogs of the active centers to a great extent. It has been shown to be advantageous for the consumption a regenerating suspension if only a small portion of the regenerating suspension is continuously removed and regenerated, i.e. the larger part can be employed in a recirculating operation.

An additional opportunity for reducing the scrubbing water is the use of a suitable abrasive which only removes the surface layer. This method can also be practiced inside the nitrogen removal installation. The abrasive (for example small glass spheres), together with the parts of the gas diffusion-hindering surface layer, can then be disposed of together with the fly ash from the electronic filter.

Further advantageous developments of the present invention are defined in the claims.

An exemplary embodiment for the use of a suitable regeneration device will be described in greater detail in what follows, making reference to the attached drawings.

DESCRIPTION OF THE PREFERRED EMBODIMENT

Figures 1, 2:
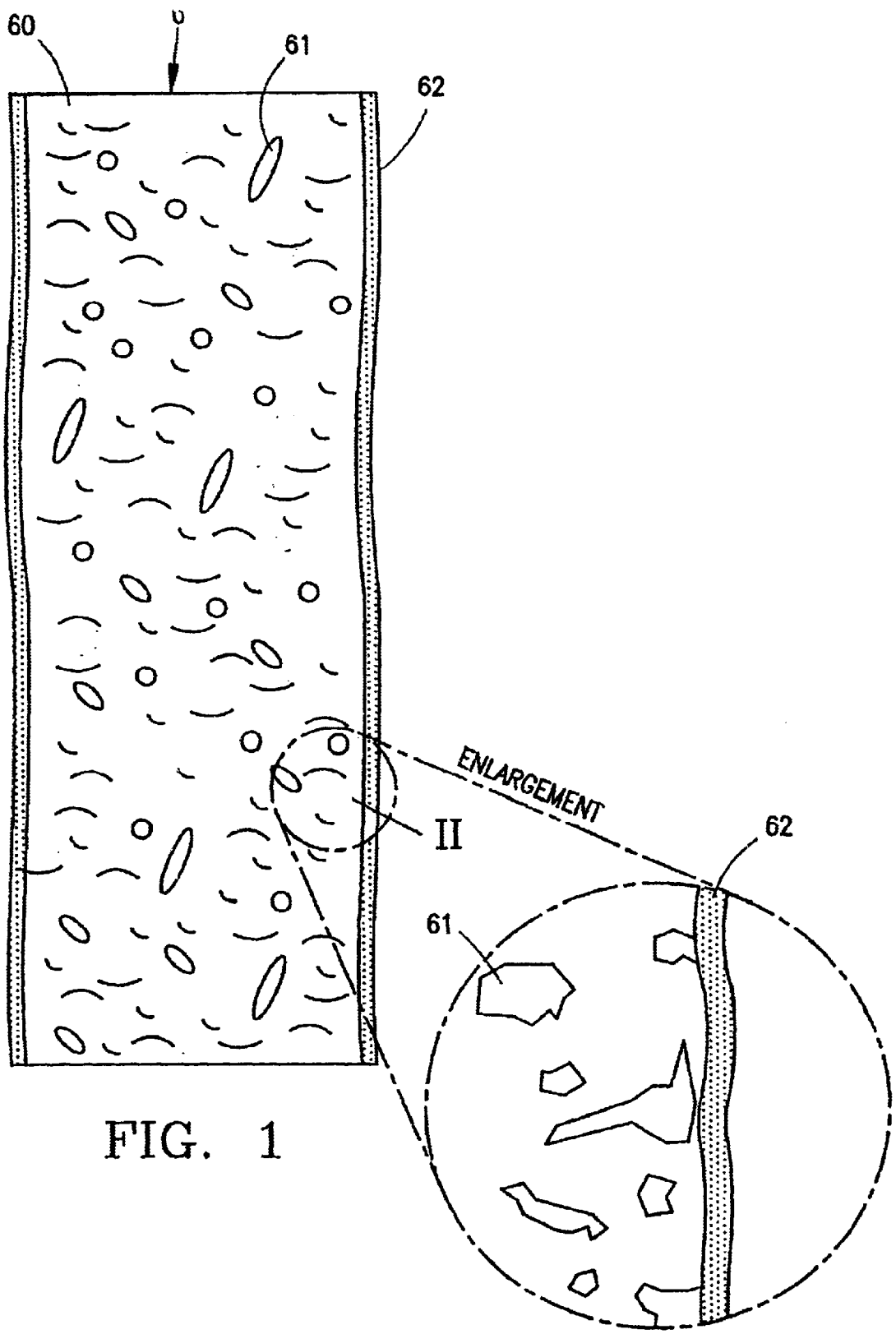
FIG. 1, is a schematic structure of a catalytic device strip with surface layers.
FIG. 2, is an enlargement of a portion of FIG. 1, FIG. 3, is a schematic flow graph for the cleaning of catalytic devices inside a DENOX installation.

FIGS. 1 and 2 show an enlarged sectional view through a catalytic device strip 60 of a catalytic device 6. A catalytic device strip 60 of a honeycomb catalytic device with pores 61 is represented. A surface layer 62 of a thickness of approximately 1 to 100 μm grows with increasing length of operation which, with increasing thickness, hinders, more and more, the diffusion of the stack gas to be cleaned into the catalytic material in particular the pores 61.

Figure 3:
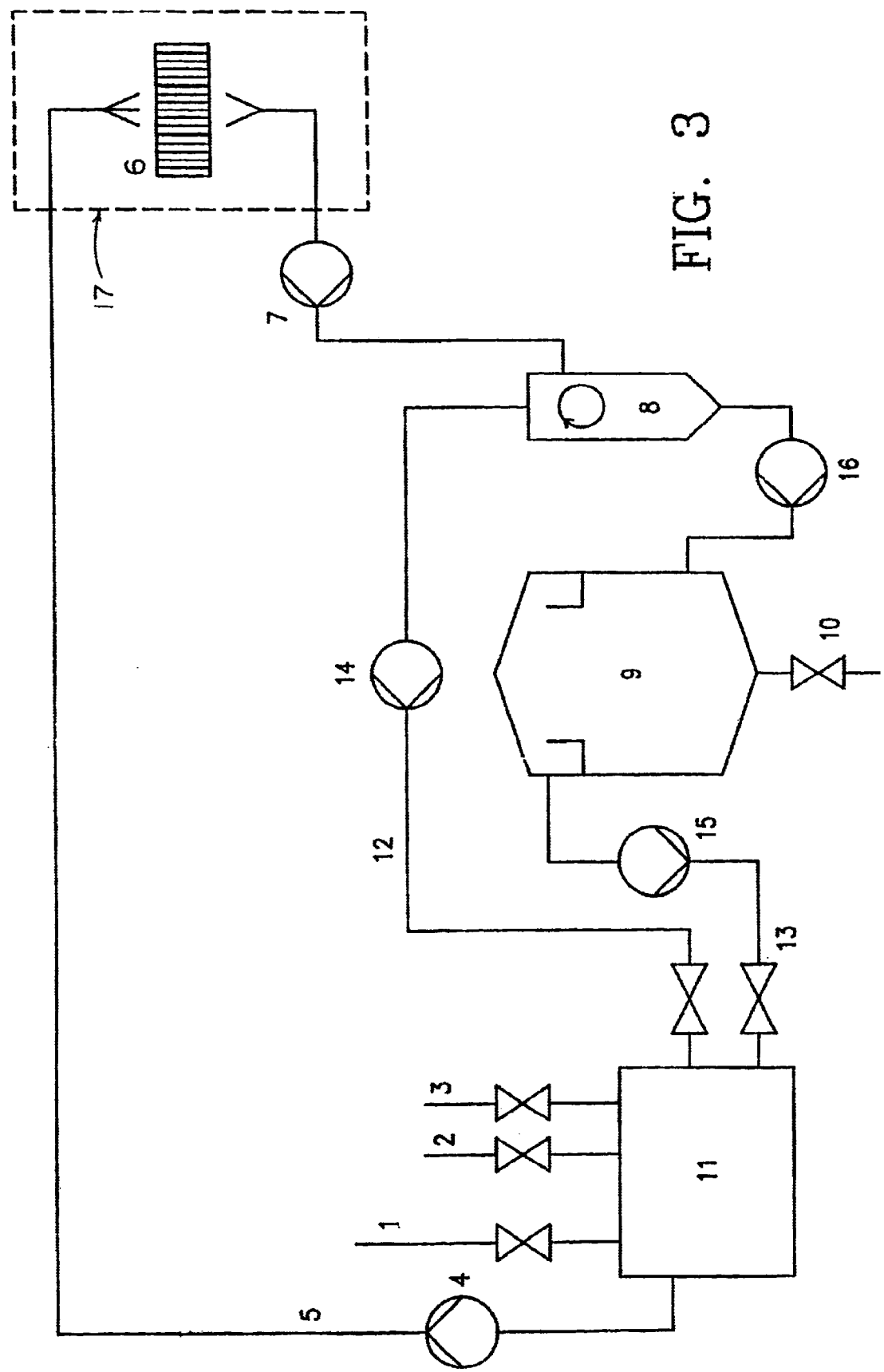

An exemplary embodiment of the present invention becomes clear by means of the flow graph of the method represented in FIG. 3.

A container 11 is filled with a desalted water, for example demineralized water, from the complete desalination installation of a power plant, via a line 1. Additives can be supplied to the scrubbing fluid via lines 2 and 3, for example regenerating substances, such as vanadium, molybdenum or tungsten, for example. A pump 4 conveys the regenerating suspension through a line 5 into a DENOX installation 17, where the catalytic devices 6 are scrubbed. The scrubbing fluid with the materials contained in the surface layer and the catalytic poisons are conducted via a suitable catching device, for example a funnel, and a pump 7 to a separating device 8. There, the materials contained are separated in a suitable manner from the scrubbing fluid. A hydrocyclone, for example, is suitable for this purpose. However, filters of the like are also conceivable. The underflow from the separating device 8, which is heavily loaded with solids, is conveyed via a pump 16 to a settling tank 9. The solid components are further concentrated in this settling tank 9, are drawn off in a partial flow via a line 10, and conveyed to a suitable waste water treatment, not represented here. The overflow of the settling tank 9 and the upper flow of the separating device 8 are conveyed to a container 11 via lines 12 and 13 and pumps 14 and 15.

This structure can be expanded by suitable precipitation stages, in which dissolved noxious matter, such as the catalytic poison arsenic, for example, is precipitated, so that it can be separated by means of the separating device 8 and removed from the scrubbing fluid. The scrubbing, or respectively regenerating fluid is conveyed in circulation in this way, from which only a defined volume of fluid with the concentrated noxious matter, is removed per circuit. This volume is replenished through the lines 1, 2 and 3.

A further possibility for execution is closing the honeycombs of the catalytic device, or respectively of the reactor, below the catalytic device 6. The catalytic devices are thereafter filled with the scrubbing, or respectively regenerating fluid. During this bath in the regenerating fluid, first the gas diffusion-hindering surface layer is loosened. The catalytic poisons inside the pores of the catalytic device are then loosened from the active centers on the surface of the catalytic device and are transferred into the regenerating fluid. Because of the concentration drop between the regenerating fluid inside the pores of the catalytic device and the regenerating fluid in the honeycomb channels, the dissolved catalytic poisons move to the honeycomb channels. After a defined period of time the regenerating fluid with the components of the gas diffusion-hindering surface layer and the catalytic poisons is drained. The catalytic devices are thereafter dried by means of stack gas or hot air. The advantage of this embodiment lies in the low consumption of regenerating fluid.

Complementing the mentioned exemplary embodiments it is also possible to connect the regeneration of catalytic devices directly with drying. In large nitrogen-removing installations it can occur that tons of regenerating fluid still remain in the catalytic devices 6. The structural steel for receiving the catalytic modules must be designed for this additional weight. This is not the case in some installations. It is then necessary to dry a partial section immediately after the regeneration of this section. In the course of this, the catalytic devices 6 are first regenerated as described. Following regeneration, the regenerated section is dried by means of hot air or hot gas. By means of this the regenerating suspension remaining in the catalytic devices 6 is evaporated and removed.

Figure 4:
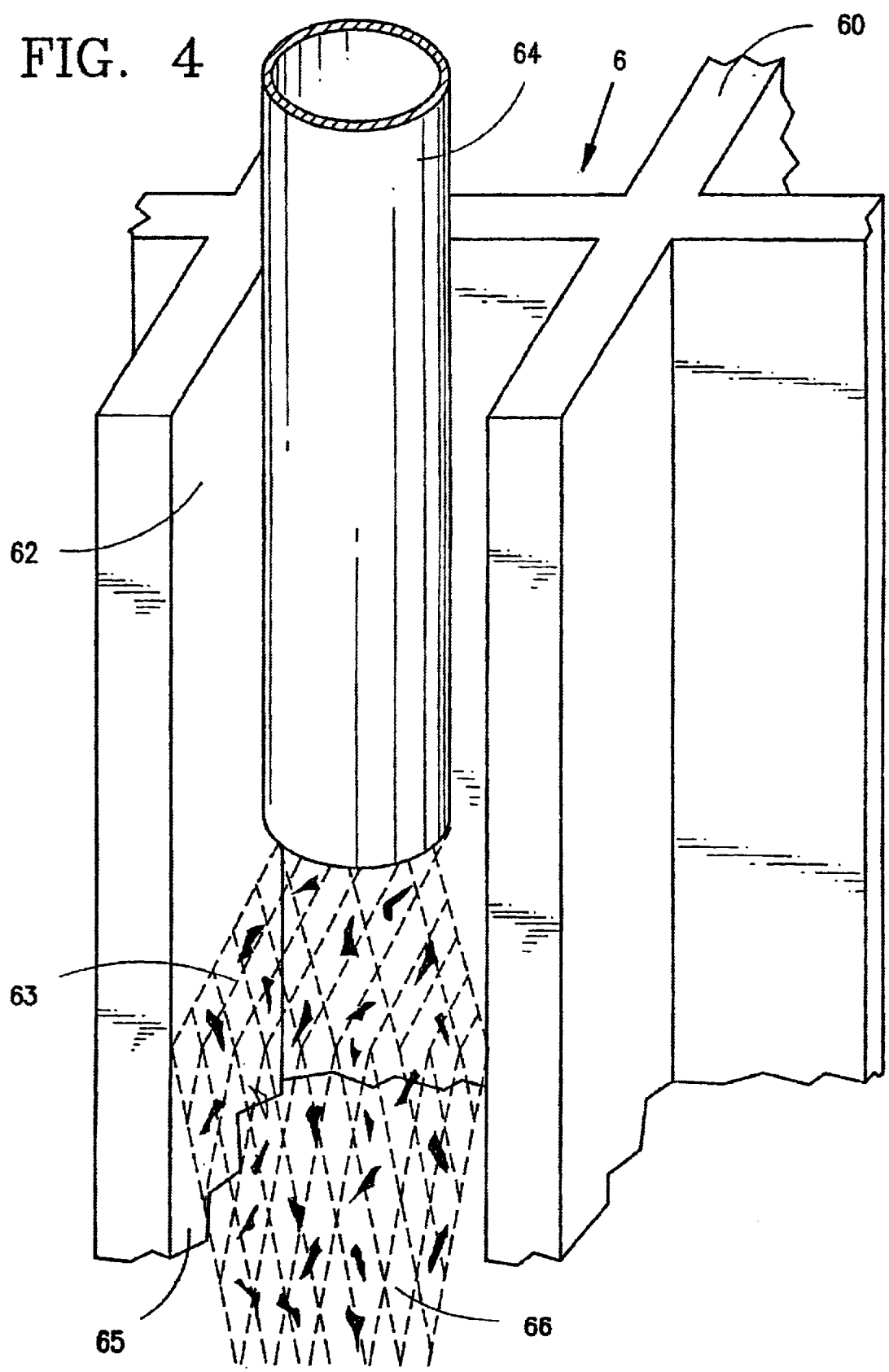
FIG. 4, is a schematic view of the cleaning of the catalytic device by means of an abrasive.

FIG. 4 shows in a schematic representation a complementing option for removing the surface layer 62 from the catalytic devices 6. An abrasive 63, for example sand or glass, is used for mechanically removing the surface layer 62. The abrasive 63 is blasted through a tube 64 or the like on the surface 65 of the catalytic device 6. The abrasive material 66, which has been contaminated with portions of the surface layer, is blown out of the catalytic device 6, or rinsed out during cleaning with the scrubbing fluid, for example.

EXAMPLE

The present invention was tested on used and deactivated catalytic devices. To this end, a deactivated catalytic element of a total length of 840 mm and the edges of the length of 150×150 mm was removed from a DENOX installation and treated in accordance with the regenerating method. Prior to regeneration with demineralized water, the catalytic element was examined in a test stand. The catalytic element was thereafter rinsed for 5 minutes with demineralized water and subsequently dried with hot air. A subsequent examination showed that the NOX precipitation rate was increased by approximately 5% to 6% over the entire mol ratio range of $NH_2/NOX$ of 0.8 to 1.2, as shown in the following table:

| Mol ratio $HN_2/NOX$ | 0.8 | 0.9 | 1.0 | 1.1 | 1.2 |
|---|---|---|---|---|---|
| NOX precipitation rate before regeneration | 64.8 | 70.6 | 73.7 | 75.2 | 76.4 |
| NOX precipitation rate after regeneration | 70.4 | 75.8 | 78.9 | 80.6 | 81.8 |

What claim is:

1. A cleaning kit for a fossil fuel burning facility in which a flue gas flow path is defined, said cleaning kit serving to remove process impurities carried on a surface of a wholly or partially deactivated Nox reduction catalyst which is installed in the flue gas flow path exiting from the fossil fuel burning facility to at least partially reactivate such catalyst, the cleaning kit, comprising:

a movable cleaning reagent supply grid adapted to be selectively positioned above a portion of a catalyst layer;

a source of supply of liquid cleaning reagent adapted to be in communication with said supply grid, from which a portion of the liquid cleaning reagent is directed through said supply grid in a manner that essentially all of said portion of said catalyst lever has liquid cleaning reagent passing therethrough, said liquid cleaning reagent being in contact with said portion of said catalyst layer for the removal of at least a portion of such process impurities therefrom;

a cleaning reagent collection basin adapted to be selectively positioned below such portion of said catalyst layer to catch cleaning reagent therein after such reagent passes through such portion of said catalyst layer; and recirculating means for recirculating at least a portion of such cleaning reagent received from said collecting basin and delivering same to said supply grid, said recirculating means including at least one of: a separating device for removing at least a portion of accumulated solids from said at least a portion of such cleaning reagent prior to recirculation through said supply grid, and adding portion means operative to supply additives to the liquid cleaning reagent.

2. The cleaning kit as defined in claim 1, wherein said adding portion means includes a source of water based cleaning reagent, as well as a source for the selective addition of additional admixtures to such liquid cleaning reagent.

3. The cleaning kit as defined in claim 1, wherein said separating device comprises a hydrocyclone.

* * * * *